C. H. KICKLIGHTER.
METHOD OF ELECTRIC WELDING.
APPLICATION FILED SEPT. 21, 1918.

1,310,418.

Patented July 22, 1919.

INVENTOR
Chas. H. Kicklighter.

UNITED STATES PATENT OFFICE.

CHARLES H. KICKLIGHTER, OF ATLANTA, GEORGIA.

METHOD OF ELECTRIC WELDING.

1,310,418.  Specification of Letters Patent.  Patented July 22, 1919.

Application filed September 21, 1918. Serial No. 255,030.

*To all whom it may concern:*

Be it known that I, CHARLES H. KICK-LIGHTER, a citizen of the United States, residing at Atlanta, in the county of Fulton and State of Georgia, have invented new and useful Improvements in the Methods of Electric Welding, of which the following is a specification.

This invention relates to a method of joining two pieces of metal by the use of an intermediate metallic body, which is welded to both of the two pieces and is, at the same time, softened and forced into a depression or void in one or both of the pieces so as to allow the faces of the two pieces to come into immediate contact. A small projection left on the intermediate body fits snugly into a small hole cut in the bottom of the depression or void so as to hold the intermediate body in place before and during the welding operation. A plurality of welds of this nature furnish a valuable method of making a joint or seam between heavy commercial plates or pieces of metal.

The object of the present invention is to afford an easy, simple and practical method of fastening plates or similar pieces of metal by the electric welding process. A depression is cut in one of the pieces of metal and simultaneously or later a small register hole is cut in the bottom surface of this depression. A metallic body, substantially flat in shape and having a small projection on one side, is introduced into the depression with the projection registering with the register hole. This is provided so as to hold the metallic body in the depression and to prevent its being moved out of its central position relative to the depression during the process of the work. With the parts brought into proper juxtaposition so that the metallic bodies contact with the pieces to be united along substantially the area of desired weld, mechanical pressure is applied and heating electric current is applied so as to weld the parts together and bring the juxtaposed faces of the two pieces of metal into immediate contact. The pieces of metal to be fastened are not welded directly together or fastened directly together, but are fastened through the medium of an intermediate body or bodies, by both being welded thereto.

In the electric welding of heavy commercial stock I have found that best results are obtained by having the areas of initial contact substantially the same as the areas of the desired weld and of applying the pressure along an axis normal to the planes of these areas. In this case the surfaces of contact are brought to a welding heat at all points at about the same instant and a thorough fusion of the metals at all points is obtained by the time the intermediate metal is softened sufficiently to be forced into conformity with the void. Moreover, in order to secure the best commercial work it has been found necessary to keep the flat metallic bodies at the centers of the depressions. This is most easily accomplished by having a small projection on a flat surface of the metallic body register with a small hole cut into the bottom of the depression.

Figure 1:
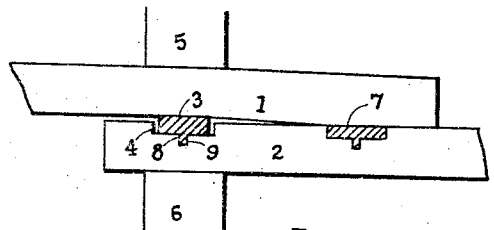
Figure 1 is a diagrammatic sketch, partly sectioned, showing one application of the present invention.
Figure 2:
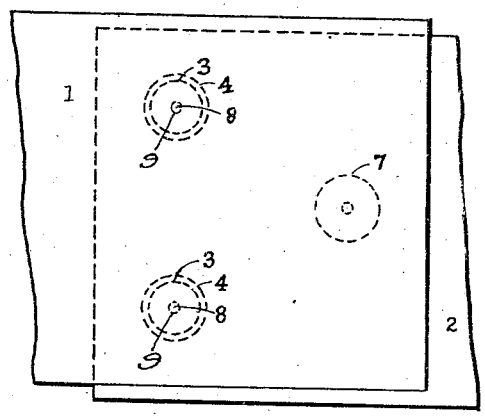
Fig. 2 is a top view of the plates of Fig. 1.

Referring to Figs. 1 and 2, the plates or pieces of metal 1 and 2 are to be fastened together. The circular disk 3, flat and rather thin, rests in the flat depression cavity or void 4 of plate 2 and its projecting portion is in contact with the face of plate 1. A projection 8 on the disk 3 fits snugly into the register hole 9 cut into the bottom of the flat depression 4. This holds the disk firmly in place and prevents its being slipped out of its central position over to one side of the depression, which would result in poor work. In lieu of a projection on the metallic disk, a hole may be drilled through the flat metallic disk and a wire driven therethrough so that its projecting end will register with the registered hole in the depression. This is in effect the same as a projection on the surface of the metallic disk. The pressure-terminal blocks 5 and 6 are adapted to be pressed upon the plates on directly opposite sides of the disk 3. By means of these blocks the assembled parts may be subjected to mechanical pressure, and at the same time to a heavy electric welding current. These blocks may be the terminals of the secondary circuit of an electric welding machine, the construction of which is well known in the art and a description of which it is not thought necessary herein to give.

Upon the application of pressure and the welding electric current, the contacting parts are welded together and the disk 3 is softened and forced downward into the depression or void 4 so as to allow the plates to come into immediate contact. The position and shape of the disk after the welding operation is shown by 7. Fig. 2 represents a top view of the plates of Fig. 1, with the pressure terminals removed. As above described, 3 and 4 illustrate the disks and depressions, and 8 and 9 illustrate the register projections and holes, respectively, before the welding operation, and 7 the same after the operation.

Figure 5:
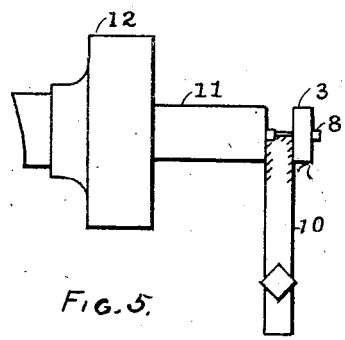
Fig. 5 is a sketch illustrating one process of making the metallic disks and register projections.

The making of the metallic disks and the forming of the depressions in the plates are simple processes. In Fig. 5 a special shaped cut-off tool 10 is shown cutting a disk 3 with its register projection 8 from a round bar 11 of iron held by a rotating lathe-chuck 12. Appropriate stops can be used, as is well understood in the art, for regulating the distance to which the tool 10 is fed forward into the stock 11 and for quickly setting the tool 10, longitudinally, so as to cut the disks 3 of a uniform thickness.

Figure 6:
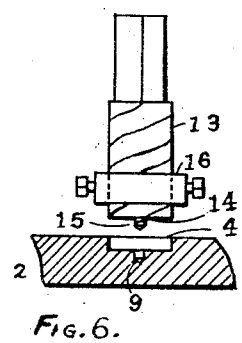
Fig. 6 is a sketch illustrating one process of forming depressions with register holes in a commercial plate.

In Fig. 6 a compound drill 13 with a flat cutting edge 14, a small projecting drill 15 and a stop 16 is shown just as it has finished cutting depression 4 with register hole 9 in a plate 2.

Figure 3:
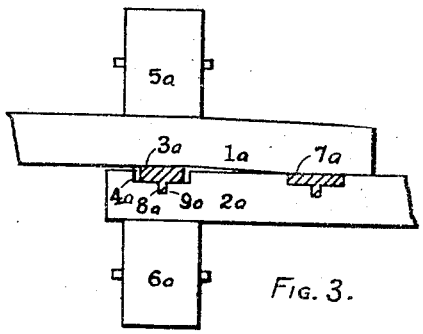
Fig. 3 is a diagrammatic sketch partly sectioned showing another application of the present invention.
Figure 4:
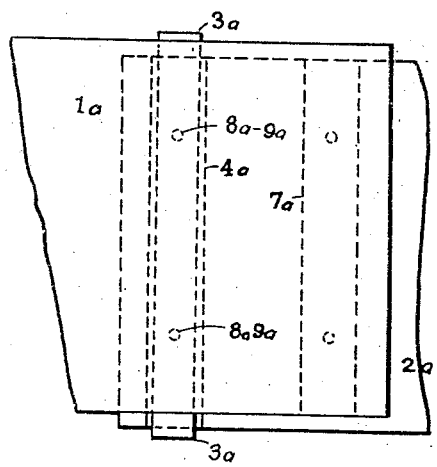
Fig. 4 is a top view of the plates of Fig. 3.

Referring to Figs. 3 and 4, the plates or pieces of metal $1^a$ and $2^a$ are to be fastened together by means of both being welded to one or more flat bars $3^a$. Initially, a bar $3^a$ rests in a flat bottomed groove $4^a$ in one plate $2^a$, and its projecting lateral surface contacts with the surface of the other plate $1^a$. Projections $8^a$ on the bars $3^a$ fit snugly into the register holes $9^a$ cut into the bottom of the flat groove $4^a$. These hold the bar firmly in place and prevent it being moved out of its central position over to one side of the groove which might result in poor work. The area of initial contact is substantially the same as the areas of desired weld, or at least the points of initial contact are well distributed over the areas of desired weld. $5^a$ and $6^a$ are pressure-terminal rollers by which the assembled parts may be subjected to mechanical pressure and welding electric current. $7^a$ illustrates the position and shape assumed by a bar after the welding operation, during which it has been softened and forced downward into a groove. Fig. 4 represents the top view of the plates of Fig. 3, with pressure rollers omitted. As above described, $3^a$ represents a bar in a groove $4^a$, and $8^a$ and $9^a$ represent the register projections and holes, respectively, before the welding operation and $7^a$ the same after the operation. In this case, it is a simple matter to drill the register holes after the groove $4^a$ has been cut and to form the projections on the bar $3^a$ by drilling small holes therein and then forcing short pieces of wire into the holes with ends projecting on one side.

The operation is apparent. After the preparation of the parts by making depressions or grooves in the surfaces of one or both of the plates or metal pieces, and forming register holes in the bottoms of the depressions or grooves, the parts are brought into the proper juxtaposition with comparatively thin and flattened disks or bars resting in the depressions or grooves, as the case may be, in one of the plates. The disks or bars are so adjusted that the projections thereon enter the register holes. The other plate is then brought into contact with the projecting flat surfaces of the disks or bars. The projections in the register holes maintain the disks or bars in their central positions. In these positions the assembled parts are subjected to pressure and heating electric current by the application of pressure-terminal blocks or rolls. The intermediate metallic bodies are welded to both plates and are, at the same time, softened and forced into the depressions or grooves so as to permit the faces of the plates to come into immediate contact.

What is claimed is:—

1. The method of fastening two thick plates of metal together face to face, which consists in forming a flat bottom depression in the face of one of the plates of less depth than the thickness of the plate in which it is formed, forming a register hole in the bottom of the depression, inserting in said depression a metallic body having parallel flat top and bottom faces with a register projection on one thereof and being of sufficient thickness to hold the opposing faces of the plates apart during the welding operation, registering said register projection with said register hole so as to hold the metallic body in a correct position, and by the application of pressure and heating electric current welding the opposed faces of said plates to the opposite parallel faces of said metallic body so that the surfaces of contact conform with one another and are of appreciable area, whereby the metallic body will readily soften and occupy the depression so that the two plates of metal may come into immediate facial contact.

2. The method of fastening two thick plates of metal together face to face, which consists in forming flat bottom depressions in the face of one of the plates of less depth than the thickness of the plate in which they are formed, forming registering holes in the bottoms of said depressions, inserting in said depressions metallic bodies having substantially flat top and bottom faces (with register projections thereon) and being of sufficient thickness to hold the opposing faces of the plates apart during the welding operation, registering said register projections with said register holes so as to hold the several metallic bodies in their correct positions, and by the application of pressure and heating electric current welding the opposing faces of said plates to the opposite parallel faces of said metallic bodies and heating the metallic bodies so that they readily soften, occupy the depressions and allow the plates to be forced into immediate facial contact.

3. The method of fastening two thick plates of metal together face to face, which consists in forming flat bottom depressions in the face of one of the plates of less depth than the thickness of the plate in which they are formed, forming registering holes in the bottoms of said depressions, inserting in said depressions metallic bodies having substantially flat top and bottom faces with means for registering same properly relative to said register holes and being of sufficient thickness to hold the opposing faces of the plates apart during the welding operation, and by the application of pressure and heating electric current welding the opposing faces of said plates to the opposite parallel faces of said metallic bodies and heating the metallic bodies so that they readily soften and occupy the depressions to permit the two plates of metal to be forced into immediate facial contact.

4. The method of fastening two thick plates of metal together face to face, which consists in forming a flat bottom channel in the face of one of the plates longitudinally of the proposed weld and of less depth than the thickness of the plate in which the channel is formed, forming register holes in the bottom of the channel, inserting in said channel an elongated metallic bar having substantially parallel flat top and bottom faces with means for registering same in proper position relative to said register holes and of sufficient thickness to hold the opposing faces of the plates apart during the welding operation, and by the application of pressure and heating electric current welding the opposing faces of said plates to the opposite parallel faces of said metallic bar so that the surfaces of contact substantially conform with one another and are of substantial area whereby the metallic bar will readily soften and occupy the depression to permit the two plates of metal to be finally pressed into immediate facial contact.

In testimony whereof, I have hereunto signed my name at Washington in the District of Columbia this 20th day of September, 1918.

CHARLES H. KICKLIGHTER.